(12) United States Patent
Pirkl et al.

(10) Patent No.: US 7,710,052 B2
(45) Date of Patent: May 4, 2010

(54) METHOD AND APPARATUS FOR OPERATION OF A PIEZO-ACTUATOR

(75) Inventors: Richard Pirkl, Regensburg (DE); Udo Reiländer, Rieden/a.F. (DE); Hans-Jörg Wiehoff, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 100 days.

(21) Appl. No.: 12/065,342

(22) PCT Filed: Aug. 29, 2006

(86) PCT No.: PCT/EP2006/065750

§ 371 (c)(1),
(2), (4) Date: Jul. 7, 2008

(87) PCT Pub. No.: WO2007/028737

PCT Pub. Date: Mar. 15, 2007

(65) Prior Publication Data

US 2008/0265805 A1    Oct. 30, 2008

(30) Foreign Application Priority Data

Sep. 6, 2005    (EP) .................................... 05019335

(51) Int. Cl.
H01L 41/04    (2006.01)
(52) U.S. Cl. ........................ 318/116; 318/567
(58) Field of Classification Search ................ 318/116, 318/567; 310/364, 317, 328
See application file for complete search history.

(56) References Cited

U.S. PATENT DOCUMENTS

| 6,849,988 | B2 | 2/2005 | Rueger ................. 310/316.03 |
| 6,986,339 | B2 | 1/2006 | Joos et al. .................... 123/498 |
| 7,392,789 | B2 | 7/2008 | Dietl et al. .................. 123/436 |
| 2004/0130240 | A1 | 7/2004 | Rueger ................. 310/316.03 |
| 2004/0237940 | A1 | 12/2004 | Joos et al. .................... 123/478 |
| 2007/0163543 | A1 | 7/2007 | Dietl et al. .................. 123/436 |
| 2007/0205700 | A1* | 9/2007 | Okamura et al. ............ 310/364 |

FOREIGN PATENT DOCUMENTS

| DE | 198 05 184 A1 | 8/1999 |
| DE | 199 21 456 A1 | 11/2000 |
| DE | 101 55 390 A1 | 5/2003 |
| DE | 103 11 141 A1 | 9/2004 |
| DE | 10 2004 006 554 B3 | 6/2005 |

* cited by examiner

*Primary Examiner*—Karen Masih
(74) *Attorney, Agent, or Firm*—King & Spalding L.L.P.

(57) ABSTRACT

A piezo-actuator is actuated in a first operating mode (B1) by pulsed supply of a first electrical variable for charging or discharging of the piezo-actuator taking into account at least one actuation parameter (P) for the piezo-actuator. The piezo-actuator is actuated in a second operating mode (B2) by non-pulsed introduction of the first electrical variable for charging or discharging of the piezo-actuator, to be precise with the first electrical variable having a predetermined profile which is substantially independent of any load change on the piezo-actuator (1). A profile of a second electrical variable of the piezo-actuator is recorded during at least one measurement time period while the predetermined profile of the first electrical variable is being applied. The at least one actuation parameter (P) of the piezo-actuator is determined as a function of the recorded profile of the second electrical variable.

14 Claims, 4 Drawing Sheets

METHOD AND APPARATUS FOR OPERATION OF A PIEZO-ACTUATOR

CROSS-REFERENCE TO RELATED APPLICATION

This application is a U.S. national stage application of International Application No. PCT/EP2006/065750 filed Aug. 29, 2006, which designates the United States of America, and claims priority to European application number 05019335 filed Sep. 6, 2005, the contents of which are hereby incorporated by reference in their entirety.

TECHNICAL FIELD

The invention relates to a method and a corresponding device for operating a piezoelectric actuator, in particular a piezoelectric actuator in an injection valve of an internal combustion engine of a motor vehicle.

BACKGROUND

Piezoelectric actuators are driven by supplying or removing an electrical quantity, e.g. an electrical voltage, an electrical current or electrical energy or an electrical charge. Due to tolerances, driving different piezoelectric actuators of similar type in a predefined manner can lead to said actuators traveling by different lengths of stroke. This results, for example, in different opening and closing times or degrees of opening of valves that are actuated by a piezoelectric actuator of this kind. The stroke of the piezoelectric actuator is dependent on a mechanical load which counteracts the extension of the piezoelectric actuator.

DE 199 21 456 A1 discloses a method and a device for controlling a piezoelectric actuator by means of which overshooting and bouncing of an injection valve equipped with the piezoelectric actuator are avoided. A circuit arrangement for controlling the piezoelectric actuator is embodied for charging and discharging the piezoelectric actuator in a plurality of time intervals for the purpose of opening and closing the injection valve respectively. The piezoelectric actuator is charged or discharged in such a way that it executes a partial stroke at a maximum gradient and, after a short delay, executes a further partial stroke at a lesser gradient, such that an aperiodic transition to a final value is approached for a mechanical system of the injection valve, said system being actuated by the piezoelectric actuator and comprising the same.

SUMMARY

According to an embodiment, a method for operating a piezoelectric actuator, may comprise the steps of: —driving the piezoelectric actuator in a first operating mode by pulsed supplying of a first electrical quantity for the purpose of charging or discharging the piezoelectric actuator taking into account at least one control parameter of the piezoelectric actuator, —driving the piezoelectric actuator in a second operating mode by non-pulsed impressing of the first electrical quantity for the purpose of charging or discharging the piezoelectric actuator with a predefined profile of the first electrical quantity, which profile is essentially independent of a change in load at the piezoelectric actuator, —recording a profile of a second electrical quantity of the piezoelectric actuator during at least one measurement period during the impressing of the predefined profile of the first electrical quantity, and —determining the at least one control parameter of the piezoelectric actuator as a function of the recorded profile of the second electrical quantity.

According to a further embodiment, the first electrical quantity may have an essentially constant value during the charging or discharging of the piezoelectric actuator in the second operating mode. According to a further embodiment, the predefined profile of the first electrical quantity may be ramp-shaped. According to a further embodiment, the predefined profile of the first electrical quantity may have the shape of a sinusoidal halfwave. According to a further embodiment, the at least one measurement period may include at least one change in load over time at the piezoelectric actuator and the at least one control parameter is determined based on the at least one change in load. According to a further embodiment, the piezoelectric actuator may be disposed in a valve in such a way that the valve opens and closes in the first operating mode as a function of the driving of the piezoelectric actuator, and the valve is closed in the second operating mode and a period of time for the impressing or a maximum absolute value of the first electrical quantity is predefined such that the valve remains closed.

According to another embodiment, a device for operating a piezoelectric actuator, may be operable: —to drive the piezoelectric actuator in a first operating mode by pulsed supplying of a first electrical quantity for the purpose of charging or discharging the piezoelectric actuator taking into account at least one control parameter of the piezoelectric actuator, —to drive the piezoelectric actuator in a second operating mode by non-pulsed impressing of the first electrical quantity for the purpose of charging or discharging the piezoelectric actuator, more specifically with a predefined profile of the first electrical quantity, which profile is essentially independent of a change in load at the piezoelectric actuator, —to record a profile of a second electrical quantity of the piezoelectric actuator during at least one measurement period during the impressing of the predefined profile of the first electrical quantity and —to determine the at least one control parameter of the piezoelectric actuator as a function of the recorded profile of the second electrical quantity.

According to a further embodiment, for the purpose of impressing the predefined profile of the first electrical quantity in the second operating mode, the device may include a measurement source which is provided in addition to an energy source provided for the purpose of driving the piezoelectric actuator in the first operating mode.

BRIEF DESCRIPTION OF THE DRAWINGS

Exemplary embodiments of the invention are explained below with reference to the schematic drawings, in which.

Figure 1:
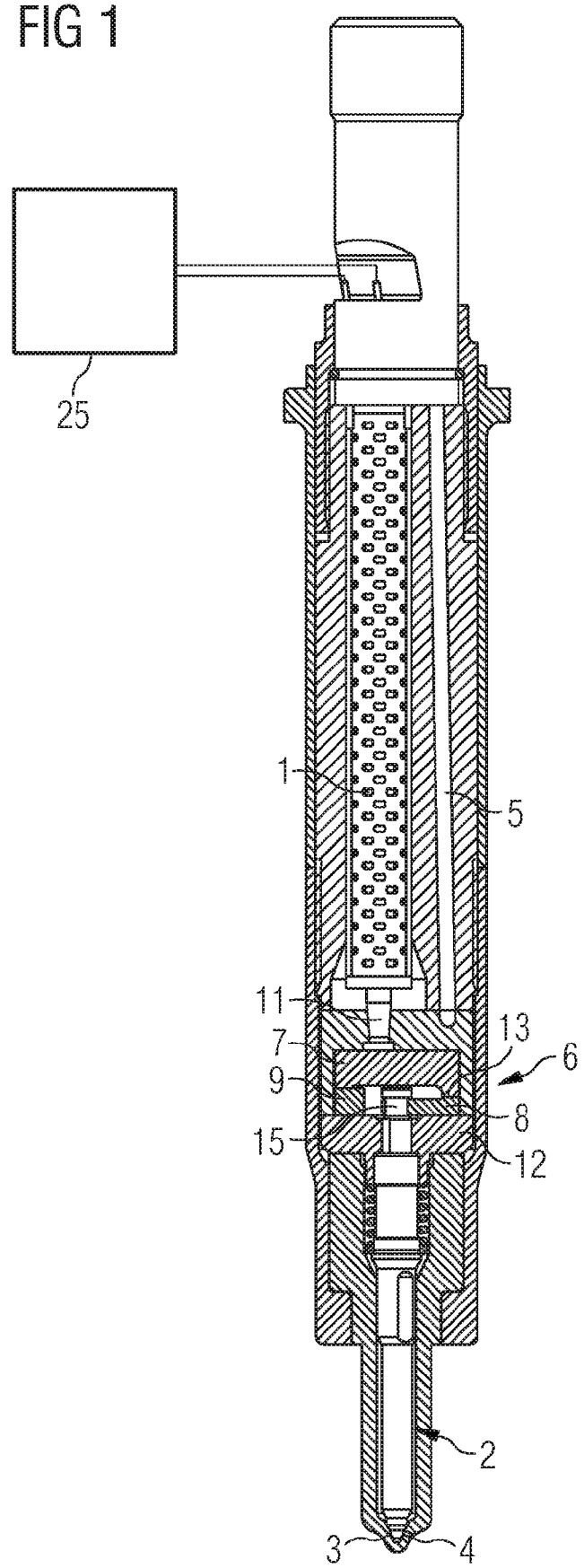
FIG. 1 shows a valve and a control unit.

Elements of identical construction or function are labeled with the same reference signs throughout the figures.

DETAILED DESCRIPTION

According to an embodiment, the piezoelectric actuator is driven in a first operating mode by pulsed supplying of a first electrical quantity for the purpose of charging or discharging the piezoelectric actuator, taking into account at least one control parameter of the piezoelectric actuator. The piezoelectric actuator is driven in a second operating mode by non-pulsed impressing of the first electrical quantity for the purpose of charging or discharging the piezoelectric actuator, more specifically with a predefined profile of the first electrical quantity, which profile is essentially independent of a change in load at the piezoelectric actuator. A profile of a second electrical quantity of the piezoelectric actuator is recorded during at least one measurement period during the impressing of the predefined profile of the first electrical quantity. The at least one control parameter of the piezoelectric actuator is determined as a function of the recorded profile of the second electrical quantity.

The advantage is that the piezoelectric actuator is stimulated to oscillate to a significantly lesser degree by the non-pulsed driving in the second operating mode than by the pulsed driving in the first operating mode. Accordingly, the profile of the second electrical quantity can be recorded in the second operating mode very precisely and largely without disruptions by which the second electrical quantity is overlaid due to the oscillating of the piezoelectric actuator in the first operating mode. The at least one control parameter can thus be determined easily and precisely and as a result the piezoelectric actuator can be driven particularly precisely in the first operating mode.

According to an embodiment, the first electrical quantity has an in each case essentially constant value in the second operating mode during the charging and discharging of the piezoelectric actuator or the predefined profile of the first electrical quantity is ramp-shaped or has the shape in each case of a sinusoidal halfwave. This has the advantage that this is particularly easy to implement.

According to a further embodiment, the at least one measurement period includes at least one change in load over time at the piezoelectric actuator. The at least one control parameter is determined based on the at least one change in load. This has the advantage that the at least one change in load can be particularly easily determined by the non-pulsed driving of the piezoelectric actuator in the second operating mode.

According to yet a further embodiment, the piezoelectric actuator is disposed in a valve in such a way that the valve opens and closes as a function of the driving of the piezoelectric actuator in the first operating mode and the valve is closed in the second operating mode and a duration of the impressing or a maximum absolute value of the first electrical quantity is specified such that the valve remains closed. The advantage is that disruptions due to the opening of the valve in a system in which the valve is disposed are avoided.

According to a further embodiment, the device comprises, for the purpose of impressing the predefined profile of the first electrical quantity in the second operating mode, a measurement source which is provided in addition to an energy source provided for driving the piezoelectric actuator in the first operating mode. The energy source is embodied, for example, to supply the piezoelectric actuator 1 with a predefined current, a predefined voltage, a predefined amount of charge or a predefined amount of energy. The measurement source is embodied either as a voltage source or as a current source. The advantage is that the measurement source can be embodied such that the first electrical quantity, e.g. an electrical voltage or an electrical current, can be supplied to the piezoelectric actuator particularly precisely.

A valve, e.g. an injection valve for an internal combustion engine of a motor vehicle, in particular a common-rail diesel injection valve, comprises a piezoelectric actuator 1 and a closing body 2 (FIG. 1). In a closed position of the valve, the closing body 2 sits on a valve seat 3 and thereby closes an injection port 4 of the valve. The injection port 4 is released by the lifting-off of the closing body 2 from the valve seat 3. A fuel feed 5 is provided in order to route fuel, e.g. diesel fuel, to the injection port 4. The valve also comprises a lever device 6 which is mechanically disposed between the piezoelectric actuator 1 and the closing body 2 and is coupled to these. The closing body 2 comprises a valve needle which interacts with the valve seat 3, and a valve piston 15 which interacts with the lever device 6.

The lever device 6 is embodied in such a way that the direction of stroke of the closing body 2 runs opposite to the direction of stroke of the piezoelectric actuator 1. With the illustrated arrangement of the piezoelectric actuator 1, this means that the valve can be opened inward by the lifting-off of the closing body 2 from the valve seat 3 when the piezoelectric actuator 1 is driven in such a way that it lengthens. The valve is closed by driving the piezoelectric actuator 1 in such a way that it contracts.

Figure 2:
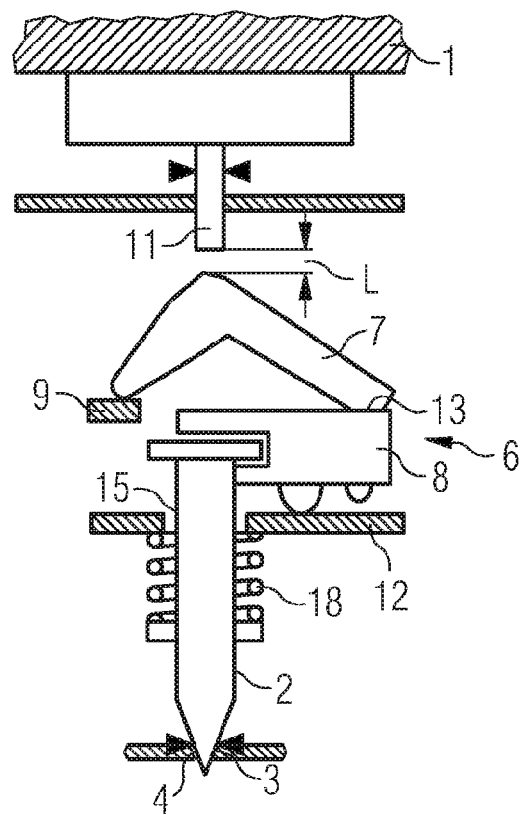
FIG. 2 shows a schematic representation of the valve.

FIG. 2 shows a schematic representation of the valve and in particular the lever device 6. The piezoelectric actuator 1 can be coupled to the lever device 6 by way of a pin 11. The lever device 6 comprises a first lever element 7 and a second lever element 8. The first lever element 7 is mounted in a stationary manner on a first counterbearing body 9. The pin 11 acts on the first lever element 7 when the piezoelectric actuator 1 has extended so far that it has overcome an idle stroke L. The second lever element 8 is mounted on a second counterbearing body 12. Furthermore, the first lever element 7 is mounted by way of a bearing 13 on the second lever element 8. As a result the first lever element 7 and the second lever element 8 are directly coupled to each other mechanically.

The second lever element 8 is embodied in such a way that the second lever element 8 and the second counterbearing body 12 touch at different points as a function of the stroke of the piezoelectric actuator 1. As a result the lever arm of the second lever element 8 is variable. By appropriate embodying of the lever element 8 the lever device 6 has at least two different transmission ratios, dependent on the stroke of the piezoelectric actuator 1.

The valve has a valve spring 18 which presses the closing body 2 into its closed position. This ensures that the valve is closed when it is not in operation. In addition to the spring force of the valve spring 18, the pressure of the fuel supplied via the fuel feed 5 acts on the closing body 2. The fuel pressure can be greater than e.g. 2000 bar. This means that a very great force must be applied in order to lift off the closing body 2 from the valve seat 3. Furthermore, for the purpose of injecting the fuel the closing body 2 must be lifted off so far from the valve seat 3 that a predefined amount of fuel can be injected in a predefined period of time.

A particularly high force is required in order to lift off the closing body 2 from the valve seat 3. It is therefore advantageous to embody the lever device 6 in such a way that the transmission ratio of the stroke of the piezoelectric actuator 1 to the stroke of the closing body 2 in a first phase of the opening operation of the valve is equivalent to e.g. about 1:1. After the closing body 2 has lifted off from the valve seat 3 and the injection port 4 has been released, a pressure compensation can take place so that essentially the closing body 2 only needs to be moved further against the spring force of the valve spring 18. In order to obtain the greatest possible stroke of the closing body 2, the transmission ratio is smaller in this second phase of the opening operation of the valve, e.g. about 1:10.

The valve has a stroke limiter for the closing body 2. The stroke limiter is formed by the first lever element 7, which is disposed in the axis of motion of the closing body 2 (FIG. 1). The valve therefore has its maximum opening state when the closing body 2 or valve piston 15 comes into contact with the first lever element 7.

During the opening operation of the valve and equally during the closing operation of the valve, the load acting on the piezoelectric actuator 1 is subject to changes. A change in load of this kind is caused for example by the pin 11 striking the first lever element 7, that is to say when the idle stroke L has just been overcome. A change in load of this kind is also caused by the closing body 2 lifting off from the valve seat 3 or the closing body 2 coming to land on the valve seat 3. A further example is coming into contact of the closing body 2 with the first lever element 7 upon reaching the maximum opening state of the valve. This effects the change in load at the piezoelectric actuator 1 by way of the first lever element 7 and the pin 11. Due to the change in load at the piezoelectric actuator 1, a signal is generated in electrical quantities of the piezoelectric actuator 1, e.g. in an electrical voltage Up of the piezoelectric actuator 1. Said signal can be recorded and evaluated for example by a control unit 25 which is electrically coupled to the piezoelectric actuator 1. As a function of the signal, e.g. dependent on a time of occurrence of the signal, at least one control parameter P can thus be adjusted for the purpose of driving the piezoelectric actuator 1 in order to enable the desired amount of fuel to be metered with maximum precision. The at least one control parameter P is e.g. a value of an electrical current or an electrical voltage, an electrical amount of charge or energy or a period of time for charging or discharging up to a predefined change in load.

Figure 3:
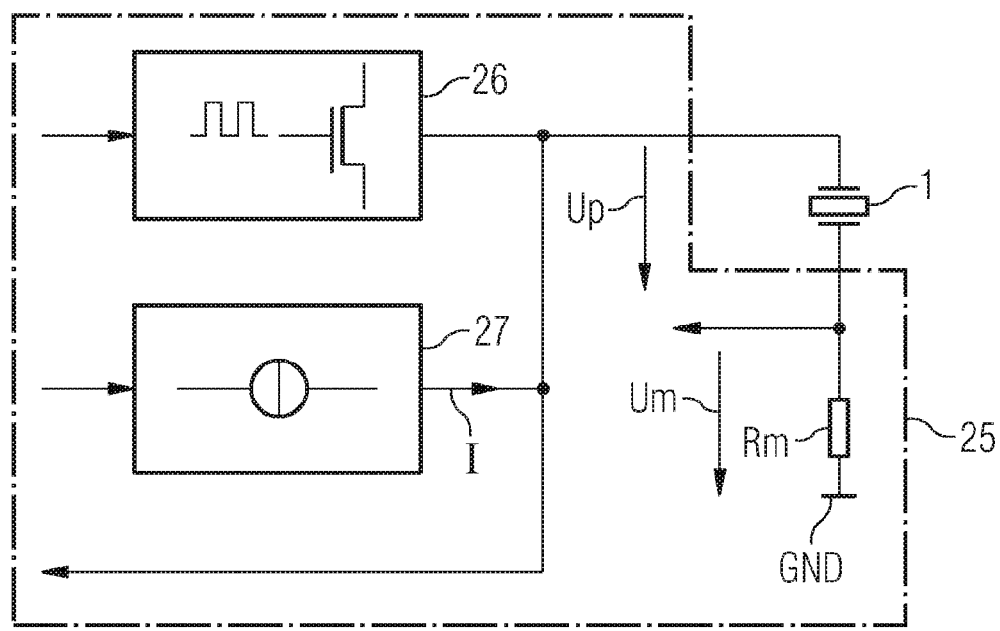
FIG. 3 shows a block diagram of the control unit.

FIG. 3 shows a block diagram of the control unit 25. The control unit 25 can also be referred to as a device for operating the piezoelectric actuator 1. The control unit 25 comprises a power output stage 26 which is embodied as an energy source for pulsed charging and discharging of the piezoelectric actuator 1.

The energy source or power output stage 26 supplies the piezoelectric actuator 1 with a first electrical quantity in a pulsed mode of operation. For example, the energy source or power output stage 26 supplies the piezoelectric actuator 1 with a predefined current, a predefined voltage, a predefined amount of charge or a predefined amount of energy. The electrical quantities not predefined in each case are derived as a function e.g. of a charge state of the piezoelectric actuator 1, the stroke of the piezoelectric actuator 1, and the load that acts on the piezoelectric actuator 1.

The power output stage 26 is electrically coupled to the piezoelectric actuator 1, which is electrically coupled to a reference potential GND via a measuring resistor Rm. When a current flows through the measuring resistor Rm, a measurement voltage Um drops across the measuring resistor Rm, said measurement voltage Um being representative of the current flow through the piezoelectric actuator 1. The electrical voltage Up of the piezoelectric actuator 1 drops across the piezoelectric actuator 1.

The control unit 25 further comprises a measurement source 27 which is embodied to impress a profile of the first electrical quantity, in particular an electrical current I or the electrical voltage Up of the piezoelectric actuator 1, on the piezoelectric actuator 1 in a non-pulsed mode of operation. The piezoelectric actuator 1 is stimulated to mechanical oscillations by the non-pulsed impressing of the first electrical quantity to a lesser degree than by the pulsed driving by the power output stage 26. The profile of the first electrical quantity is predefined by the measurement source 27 such that said profile is essentially independent of the change in load at the piezoelectric actuator 1.

Figure 4:
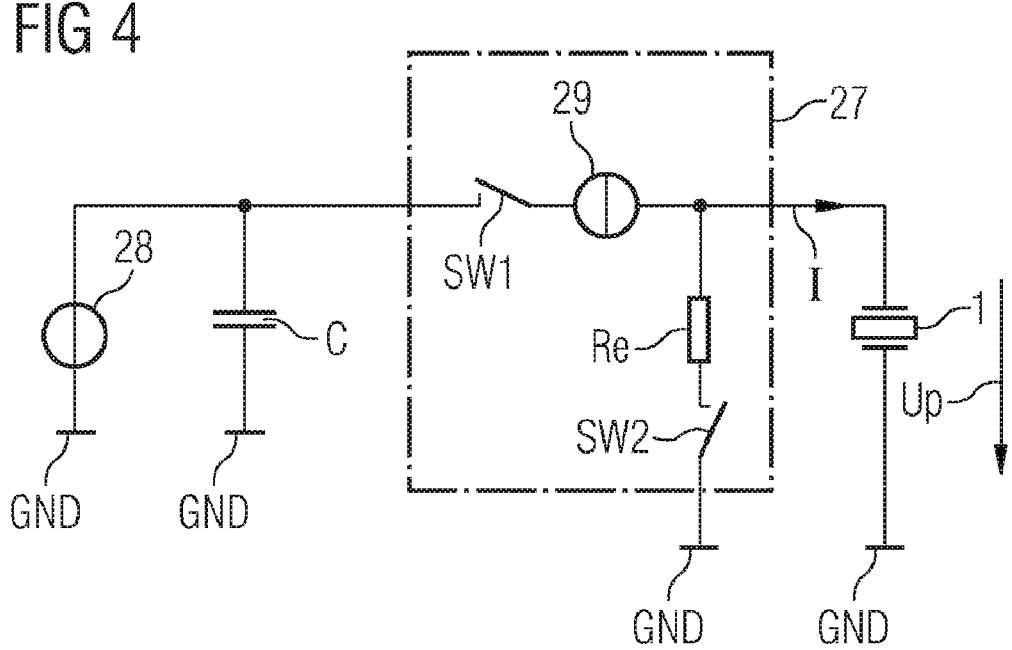
FIG. 4 shows an embodiment of a measurement source.

FIG. 4 shows a particularly simple embodiment of the measurement source 27. The measurement source 27 comprises a first switch SW1 and a second switch SW2. The measurement source 27 further comprises a current source 29 and a discharge resistor Re. The measurement source 27 is coupled on the input side to a voltage source 28. An electrical voltage of the voltage source 28 amounts, for example, to about 200 volts and is supported via a capacitor C arranged electrically parallel to the voltage source 28. The capacitor C is preferably dimensioned such that the electrical charge stored therein is sufficient for at least one drive cycle of the piezoelectric actuator 1. The first switch SW1 and the current source 29 are arranged electrically in series and disposed between the voltage source 28 and the piezoelectric actuator 1. The discharge resistor Re and the second switch SW2 form a series circuit which is arranged electrically parallel to the piezoelectric actuator 1.

In order to charge the piezoelectric actuator 1 the first switch SW1 is closed. The second switch SW2 is open. The electrical current I predefined by the current source 29 is then impressed on the piezoelectric actuator 1. The electrical voltage Up of the piezoelectric actuator 1 is dependent on the charge state of the piezoelectric actuator 1, its extension and the load acting on the piezoelectric actuator 1. For the purpose of discharging the second switch SW2 is closed. The first switch SW1 is open. The piezoelectric actuator 1 discharges across the discharge resistor Re.

The measurement source 27 can also be embodied in such a way that the piezoelectric actuator 1 is discharged by means of the electrical current I impressed by the current source 29 or by a further current source. Furthermore, the measurement source 27 can alternatively be embodied also as a voltage source in such a way that the electrical voltage Up of the piezoelectric actuator 1 is impressed on the latter for the purpose of charging and/or discharging the piezoelectric actuator 1 and the electrical current through the piezoelectric actuator 1 is dependent on the charge state of the piezoelectric actuator 1, its extension and the load acting on the piezoelectric actuator 1.

Preferably the measurement source 27 is embodied as a precise direct current source or dc voltage source. However, another continuous current profile or voltage profile can equally be specified. The current profile or voltage profile is for example ramp-shaped or for the purpose of charging and discharging the piezoelectric actuator 1 consists in each case of a sinusoidal halfwave of different polarity.

Figure 5A:
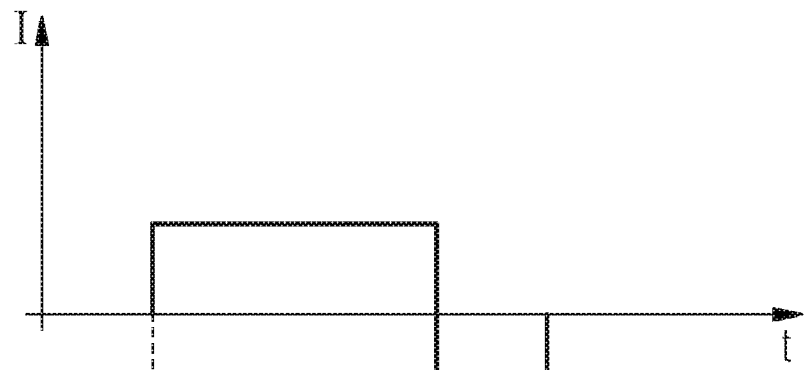
FIG. 5A shows a current profile of the measurement source.
Figure 5B:
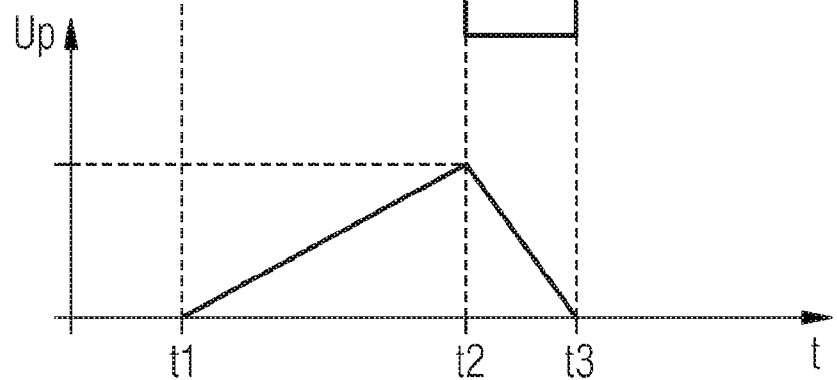
FIG. 5B shows a voltage profile of a piezoelectric actuator.

FIG. 5A shows the profile of the electrical current I of the measurement source 27, which is embodied as a direct current source. The impressing of the predefined electrical current I for the purpose of charging the piezoelectric actuator 1 starts at a first time instant t1 and ends at a second time instant t2. FIG. 5B shows the associated profile of the electrical voltage Up of the piezoelectric actuator 1. The electrical voltage Up of the piezoelectric actuator 1 rises continuously between the first time instant t1 and the second time instant t2. The discharging of the piezoelectric actuator 1 starts at the second time instant t2 and ends at a third time instant t3. The electrical voltage Up of the piezoelectric actuator 1 falls continuously between the second time instant t2 and the third time instant t3. The stroke of the piezoelectric actuator 1 is reduced accordingly. The predefined electrical current I impressed for the purpose of charging the piezoelectric actuator 1 has a positive sign, while the predefined electrical current I impressed for the purpose of discharging the piezoelectric actuator 1 has a negative sign.

Depending on the embodiment of the valve, the first electrical quantity impressed for the purpose of charging the piezoelectric actuator 1 can have a positive or a negative sign. Accordingly, the first electrical quantity impressed for the purpose of discharging the piezoelectric actuator 1 can have a positive or a negative sign.

Figure 6:
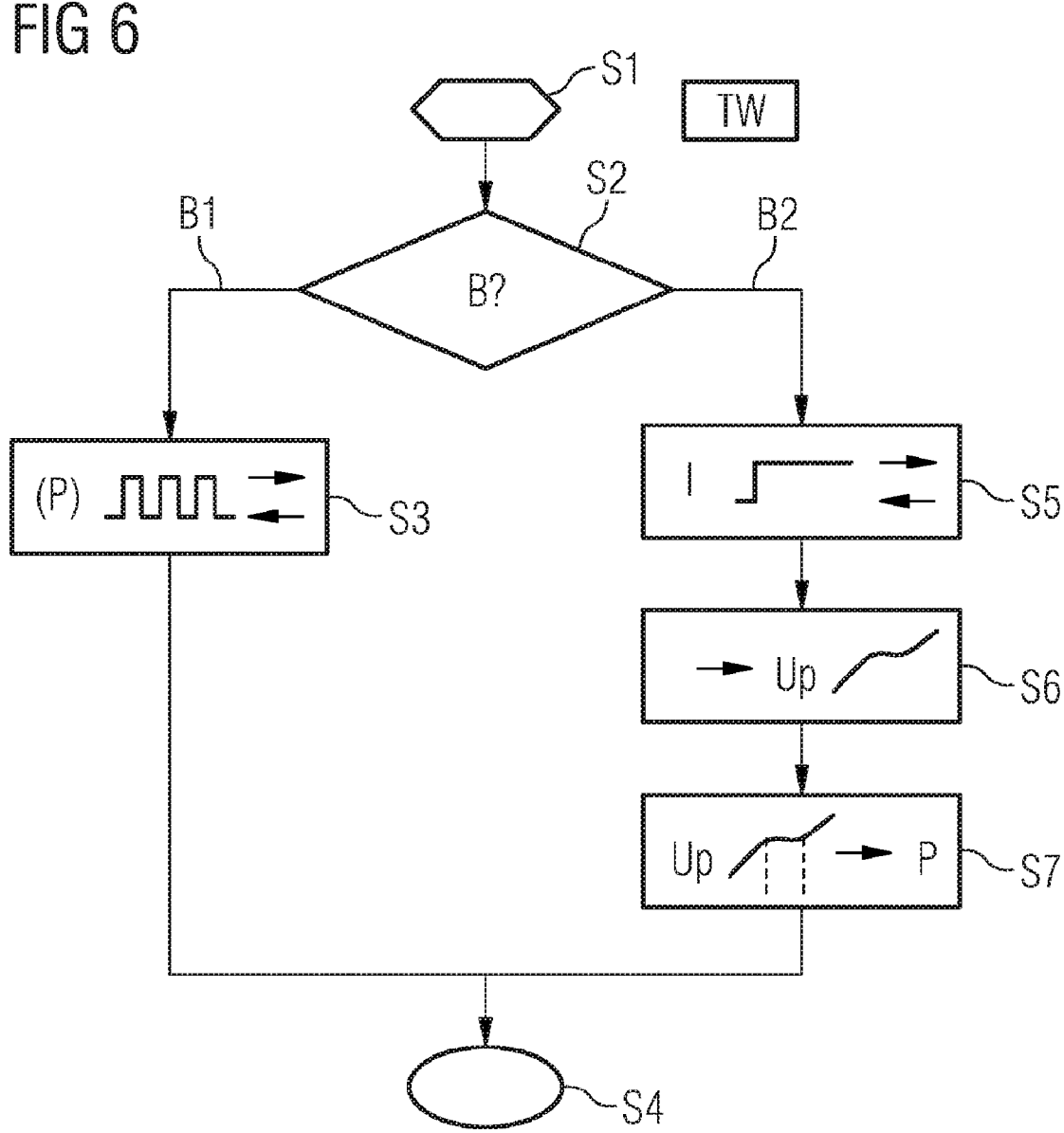
FIG. 6 shows a flowchart.

FIG. 6 shows a flowchart of a method for operating the piezoelectric actuator 1. The method starts at a step S1. At a step S2 it is determined in which operating mode B the piezoelectric actuator 1 is to be operated. If the piezoelectric actuator 1 is to be operated in a first operating mode B1, then the method is continued at a step S3. In step S3 the piezoelectric actuator 1 is driven in a pulsed mode of operation, taking into account the at least one control parameter P, for the purpose of charging or discharging the piezoelectric actuator 1, e.g. by means of the power output stage 26. The method is terminated at a step S4 and, after a waiting period TW, continued at step S1. The waiting period TW is for example the time interval between two opening or injection operations of the valve.

If, on the other hand, the piezoelectric actuator 1 is to be operated in a second operating mode B2 in step S2, then the method is continued at a step S5. Preferably the piezoelectric actuator 1 is operated in the second operating mode B2 between two injection operations. In step S5 the first electrical quantity, in this example the predefined electrical current I, is impressed on the piezoelectric actuator 1 in a non-pulsed mode of operation for the purpose of charging or discharging the piezoelectric actuator 1. At a step S6 the profile of the second electrical quantity, in this example the electrical voltage Up of the piezoelectric actuator 1, is recorded during a measurement period during the impressing of the first electrical quantity. At a step S7 the at least one control parameter P of the piezoelectric actuator 1 is determined as a function of the recorded profile of the electrical voltage Up of the piezoelectric actuator 1. The method is terminated at step S4 and, after a waiting period TW, continued at step S.

If the electrical voltage Up of the piezoelectric actuator 1 is specified as the first electrical quantity in the second operating mode B2, then the profile of the electrical current is accordingly recorded by the piezoelectric actuator 1 as the profile of the second electrical quantity, e.g. by means of the measurement voltage Um. The at least one control parameter P is determined accordingly by the piezoelectric actuator 1 as a function of the profile of the electrical current.

The first and second operating mode B1, B2 of the piezoelectric actuator 1 are executed for example alternately. Preferably the second operating mode B2 is executed less frequently than the first operating mode B1, e.g. only every tenth time. This ensures the requirements in terms of a high energetic efficiency of the measurement source 27 are kept low. Preferably the valve is closed during the second operating mode B2. The measurement source 27 is preferably embodied in such a way that a period of time for the impressing of the first electrical quantity or a maximum absolute value of the first electrical quantity is predefined such that the valve remains closed during the second operating mode B2. This ensures that the system in which the valve is disposed, e.g. the internal combustion engine, will not be adversely affected when the piezoelectric actuator 1 is operated in the second operating mode B2 for the purpose of determining the at least one control parameter P. The at least one control parameter P is then preferably based on the overcoming of the idle stroke L. However, the valve can also be opened for the purpose of determining the at least one control parameter P. e.g. during a starting operation of the internal combustion engine or during a coasting mode of the internal combustion engine, without this adversely affecting the operation of the internal combustion engine. Then, control parameters P based on the opening or closing of the valve or to other changes in load can also be determined.

Preferably the measurement period includes at least one change in load over time at the piezoelectric actuator 1, e.g. the overcoming of the idle stroke L, the lifting-off of the closing body 2 from the valve seat 3, the landing of the closing body 2 on the valve seat 3, the striking of the closing body 2 or valve piston 15 on the stroke limiter or the first lever element 7 or the change in the transmission ratios. The at least one control parameter P is preferably determined based on the at least one change in load.

Alternatively or in addition, the at least one control parameter P can also be determined by comparing the profile of the second electrical quantity with a reference profile of a reference actuator for which corresponding control parameters are known as reference parameters. Thus, for example, the at least one control parameter P is corrected relative to the corresponding reference parameter as a function of the deviation of the profile of the second electrical quantity from the reference profile.

As a result of the direct coupling of the piezoelectric actuator 1 to the closing body 2 by way of the mechanical lever device 6, the changes in load at the piezoelectric actuator 1 are particularly clearly marked in the electrical quantities of the piezoelectric actuator 1 and therefore can be particularly reliably determined from the profile of the second electrical quantity. However, the method and the corresponding device for operating the piezoelectric actuator 1 can equally be used for differently embodied valves with piezoelectric actuator drive, e.g. for injection valves in which the piezoelectric actuator 1 actuates a hydraulic control valve, such as e.g. in a pump-nozzle (unit-injector) injection valve.

What is claimed is:

1. A method for operating a piezoelectric actuator, comprising the steps of:
   driving the piezoelectric actuator in a first operating mode by pulsed supplying of a first electrical quantity for the purpose of charging or discharging the piezoelectric actuator taking into account at least one control parameter of the piezoelectric actuator,
   driving the piezoelectric actuator in a second operating mode by non-pulsed impressing of the first electrical quantity for the purpose of charging or discharging the piezoelectric actuator with a predefined profile of the first electrical quantity, which profile is essentially independent of a change in load at the piezoelectric actuator,
   recording a profile of a second electrical quantity of the piezoelectric actuator during at least one measurement period during the impressing of the predefined profile of the first electrical quantity, and
   determining the at least one control parameter of the piezoelectric actuator as a function of the recorded profile of the second electrical quantity.

2. The method according to claim 1, wherein the first electrical quantity has an essentially constant value during the charging or discharging of the piezoelectric actuator in the second operating mode.

3. The method according to claim 1, wherein the at least one measurement period includes at least one change in load over time at the piezoelectric actuator and the at least one control parameter is determined based on the at least one change in load.

4. The method according to claim 1, wherein the piezoelectric actuator is disposed in a valve in such a way that the valve opens and closes in the first operating mode as a function of the driving of the piezoelectric, and the valve is closed in the second operating mode and a period of time for the impressing or a maximum absolute value of the first electrical quantity is predefined such that the valve remains closed.

5. The method according to claim 1, wherein the predefined profile of the first electrical quantity is ramp-shaped.

6. The method according to claim 1, wherein the predefined profile of the first electrical quantity has the shape of a sinusoidal halfwave.

7. A device for operating a piezoelectric actuator, which device is operable to drive the piezoelectric actuator in a first operating mode by pulsed supplying of a first electrical quantity for the purpose of charging or discharging the piezoelectric actuator taking into account at least one control parameter of the piezoelectric actuator, to drive the piezoelectric actuator in a second operating mode by non-pulsed impressing of the first electrical quantity for the purpose of charging or discharging the piezoelectric actuator, more specifically with a predefined profile of the first electrical quantity, which profile is essentially independent of a change in load at the piezoelectric actuator, to record a profile of a second electrical quantity of the piezoelectric actuator during at least one measurement period during the impressing of the predefined profile of the first electrical quantity and to determine the at least one control parameter of the piezoelectric actuator as a function of the recorded profile of the second electrical quantity.

8. The device according to claim 7, which, for the purpose of impressing the predefined profile of the first electrical quantity in the second operating, includes a measurement source which is provided in addition to an energy source provided for the purpose of driving the piezoelectric actuator in the first operating mode.

9. A method for operating a piezoelectric actuator, comprising the steps of:

in a first operating mode, charging or discharging the piezoelectric actuator by a pulsed first electrical quantity taking into account at least one control parameter of the piezoelectric actuator, in a second operating mode charging or discharging the piezoelectric actuator by a non-pulsed first electrical quantity with a predefined profile of the first electrical quantity being essentially independent of a change in load at the piezoelectric actuator, recording a profile of a second electrical quantity of the piezoelectric actuator during at least one measurement period during the second operating mode, and determining the at least one control parameter of the piezoelectric actuator as a function of the recorded profile of the second electrical quantity.

10. The method according to claim 9, wherein the first electrical quantity has an essentially constant value during the charging or discharging of the piezoelectric actuator in the second operating mode.

11. The method according to claim 9, wherein the predefined profile of the first electrical quantity is ramp-shaped.

12. The method according to claim 9, wherein the predefined profile of the first electrical quantity has the shape of a sinusoidal halfwave.

13. The method according to claim 9, wherein the at least one measurement period includes at least one change in load over time at the piezoelectric actuator and the at least one control parameter is determined based on the at least one change in load.

14. The method according to claim 9, wherein the piezoelectric actuator is disposed in a valve in such a way that the valve opens and closes in the first operating mode as a function of the driving of the piezoelectric actuator, and the valve is closed in the second operating mode and a period of time for the impressing or a maximum absolute value of the first electrical quantity is predefined such that the valve remains closed.

* * * * *